US006899819B2

(12) United States Patent
Kim et al.

(10) Patent No.: US 6,899,819 B2
(45) Date of Patent: May 31, 2005

(54) YIG MAGNETIC CERAMIC COMPOSITION FOR MICROWAVE APPLICATION AND PREPARATION METHOD THEREOF

(75) Inventors: Dong-Young Kim, Daejon (KR); Jin Woo Hahn, Daejon (KR); Dong Suk Jun, Daejon (KR); Sang Seok Lee, Daejon (KR)

(73) Assignees: Electronics and Telecommunications Research Institute (KR); EG Co., Ltd. (KR)

(*) Notice: Subject to any disclaimer, the term of this patent is extended or adjusted under 35 U.S.C. 154(b) by 16 days.

(21) Appl. No.: 10/716,768

(22) Filed: Nov. 18, 2003

(65) Prior Publication Data

US 2004/0099837 A1 May 27, 2004

(30) Foreign Application Priority Data

Nov. 18, 2002 (KR) ............................... 10-2002-0071556

(51) Int. Cl.[7] ........................... C04B 35/40; H01F 1/10

(52) U.S. Cl. ............................... 252/62.57; 252/62.59; 501/152; 264/611

(58) Field of Search .......................... 264/611; 501/152; 252/62.57, 62.59

(56) References Cited

U.S. PATENT DOCUMENTS 3,763,045 A 10/1973 Takamizawa et al.

FOREIGN PATENT DOCUMENTS

JP 06-279106 10/1994
JP 07-061821 3/1995

OTHER PUBLICATIONS

"The Effect of Bi2O3 addition on themicrostructure and magnetic properties of YIG", Y.Y. Song, et al., Journal of Magnetic Materials, 177–181 (1998) 257–258.
"Low temperature sintering of microwave magnetic garnet materials", C. Tsay, et al., Journal of Magnetism and Magnetic Materials, 239 (2002) 490–494.
"Microwave Properties Of Hot Pressed YIG", H. Igarashi, et al., Proceedings of the International Conference, Jul. 1970, Japan pp. 530–532.

*Primary Examiner*—C. Melissa Koslow
(74) *Attorney, Agent, or Firm*—Blakely Sokoloff Taylor & Zafman

(57) ABSTRACT

The present research provides a high-density magnetic ceramic composition for microwave application and a preparation method thereof. The magnetic ceramic composition of this research includes Yttrium iron garnet (YIG, $Y_3Fe_5O_{12}$) as its basic element and a little amount of additional element, silicon oxide ($SiO_2$), which is expressed as: $Y_3Fe_5O_{12}$+x $SiO_2$ ($0.05 \leqq x \leqq 5$ mol %). The magnetic ceramic composition is prepared by measuring proper amounts of ferric oxide ($Fe_2O_3$), yttrium oxide ($Y_2O_3$) and $SiO_2$, mixing them, calcining the mixture, and molding and sintering them. Since the magnetic ceramic composition of the present research has very little magnetic loss, it can be used in components for communication in a microwave band, usefully.

5 Claims, 2 Drawing Sheets

YIG MAGNETIC CERAMIC COMPOSITION FOR MICROWAVE APPLICATION AND PREPARATION METHOD THEREOF

FIELD OF THE INVENTION

The present invention relates to a magnetic ceramic that can be used for a circulator and an isolator in a microwave band; and, more particularly, to a Yttrium iron garnet (YIG, $Y_3Fe_5O_{12}$) magnetic ceramic composition having a high sintered density and small magnetic loss, and a preparation method thereof.

DESCRIPTION OF RELATED ART

Due to the recent development in communication technology, radio communication apparatuses, such as cellular phones and communication satellites, become popular and used widely. This leads to an increasing demand for radio communication components. Jumping in on this trend, magnetic ceramic is popularly used in components for communication in a microwave band, e.g., circulators, isolators and signal-to-noise ratio (S/N) enhancer. Particularly, magnetic ceramics including Yttrium iron garnet (YIG, $Y_3Fe_5O_{12}$), Ni—Zn ferrite, Mn—Zn ferrite, Li ferrite and the like are used widely.

In order for the magnetic ceramics to be applied to components for microwave-band communication, a saturated magnetization value could be controlled within the range of from about 100G to about 1800 G. Also, it is necessary to select a material having a small ferromagnetic resonance linewidth not more than about 60 Oe. The ferromagnetic resonance linewidth represents magnetic loss of a magnetic substance. The magnetic loss of a magnetic substance is an important factor that determines the insertion loss of a component applied to communication in the microwave band. To manufacture a component having small insertion loss, materials with a small magnetic loss should be used.

Generally, among the known magnetic substances used for the microwave band applications, YIG magnetic substances are known to have a saturated magnetization value that can be controlled easily by adding an additional component, and to have the smallest magnetization loss. The ferromagnetic resonance linewidth, which indicates the magnetization loss of a magnetic substance, is expressed as:

$$\Delta H = \Delta H_{KL} + \Delta H_{imp} + \Delta H_{def}$$

where ΔH denotes a ferromagnetic resonance linewidth of a specimen;

$\Delta H_{KL}$ denotes a relaxation value of the specimen's own which is generated by Kasuya-Le Craw process;

$\Delta H_{imp}$ denotes a relaxation value generated by a bivalent or quadrivalent impurity; and $\Delta H_{def}$ denotes magnetic scattering generated in a magnetically unequal area due to defects on or inside of a material.

For technologies known for fabricating a magnetic substance having low loss, there are a method that reduces $\Delta H_{KL}$ by adding an additive, such as Ca, V, etc., and reducing the self-anisotropy of the magnetic material, and a method that reduces $\Delta H_{def}$ by preparing a high-density sintered substance and reducing the density of defects, such as pores. High-density sintered YIG can be prepared through a method that performs sintering at a high-temperature and a high pressure by using a hot pressing sintering method to increase the density of a sintered substance. However, this method has a shortcoming that it requires expensive equipment.

SUMMARY OF THE INVENTION

It is, therefore, an object of the present invention to provide a high-density magnetic ceramic composition having a low magnetic loss, which can be used in a microwave band, and a method for preparing the high-density magnetic ceramic composition.

BRIEF DESCRIPTION OF THE DRAWINGS

The above and other objects and features of the present invention will become apparent from the following description of the preferred examples given in conjunction with the accompanying drawings, in which.

DETAILED DESCRIPTION OF THE INVENTION

Figure 1:
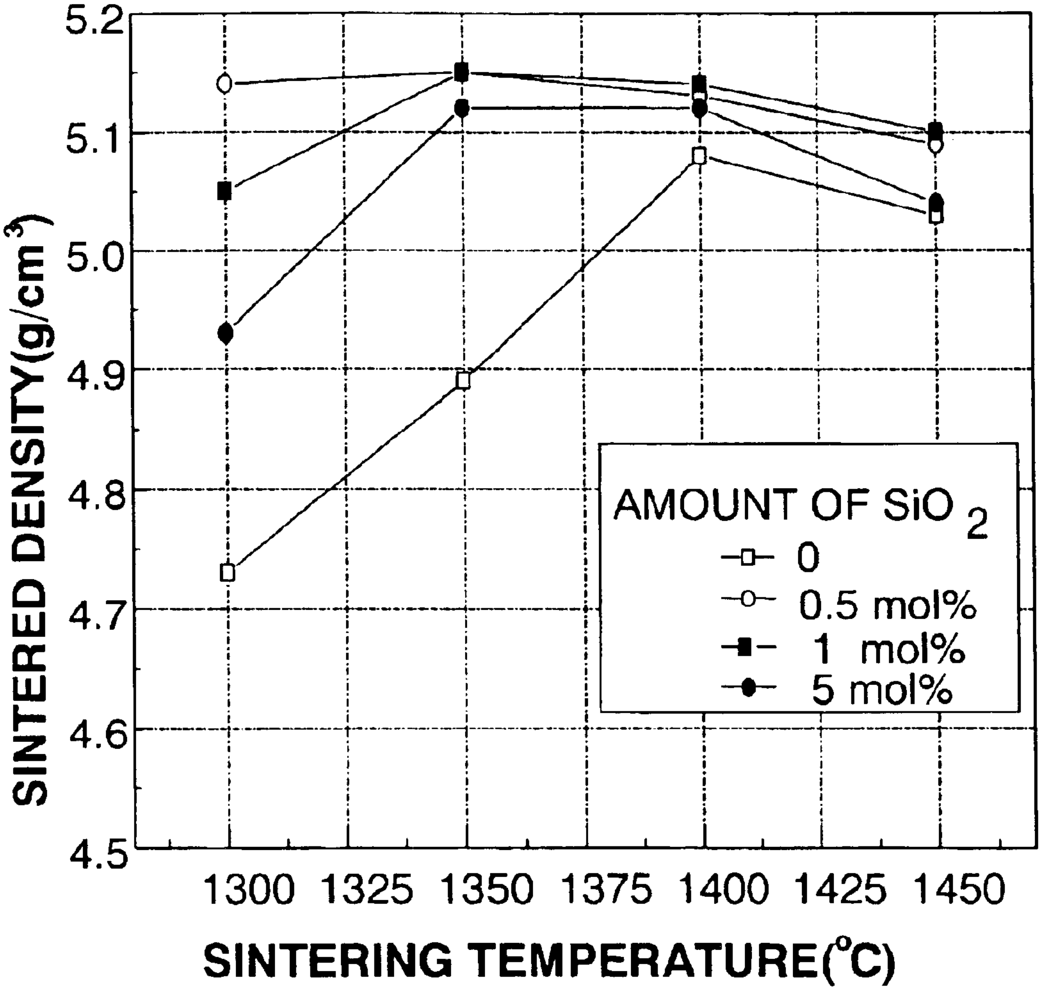
FIG. 1 is a graph showing a sintered density of $Y_3Fe_5O_{12}$ composition based on sintering temperature in accordance with the present invention.
Figure 2:
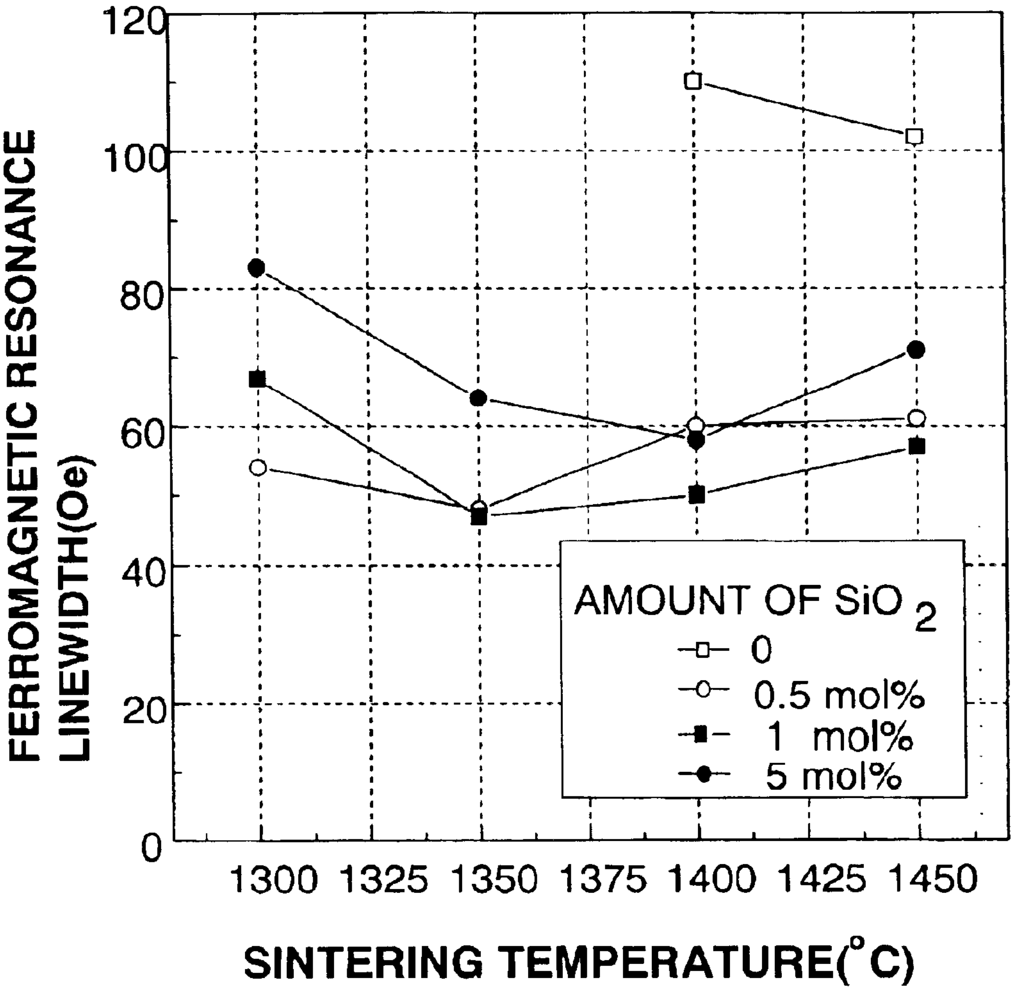
FIG. 2 is a graph illustrating a ferromagnetic resonance linewidth of $Y_3Fe_5O_{12}$ composition based the sintering temperature in accordance with the present invention.

Other objects and aspects of the invention will become apparent from the following description of the examples with reference to the accompanying drawings, which is set forth hereinafter.

To achieve the objects of the present invention, the inventor has found that the sintering and magnetic characteristics can be improved when a little quantity of $SiO_2$ is added to a basic composition of $Y_3Fe_5O_{12}$ (YIG). YIG is a magnetic substance having a very small magnetic loss. Monocrystal YIG is known to have a ferromagnetic resonance linewidth of less than about 0.5 Oe. The ferromagnetic resonance linewidth indicates the magnetic loss. However, in case of a sintered substance, the magnetic loss is increased by defects, such as grain boundary and pores, which exists on and/or inside the substance. Studies have been conducted to reduce the density of defects by increasing the sintered density of a sintered substance. Conventionally, high-density sintered YIG is prepared by performing hot pressing sintering which is performing sintering at a high temperature and a high pressure to increase the density of the sintered substance. However, this method has shortcomings that it requires expensive equipment and that it cannot be applied to mass production. The present invention, however, suggests a solution to these problems.

The present invention provides a method for preparing high-density sintered substance by lowering the sintering temperature and removing defects, such as pores, and provides a YIG magnetic ceramic composition with small magnetic loss in a microwave band, which is prepared in the method for preparing high-density sintered substance. Also, the present invention provides variances in each process, which help to obtain reproducible magnetic characteristics of the YIG magnetic ceramic composition.

In the present invention, a magnetic ceramic composition for microwave applications is prepared by adding a little quantity of $SiO_2$ to a basic composition of YIG ($Y_3Fe_5O_{12}$).

As described above, conventionally, the high-density YIG magnetic substance can have the best characteristics, when it is prepared in the hot pressing sintering method. This is because the density of the magnetic substance can be increased, when it is sintered at a high temperature and a high pressure to eject out its internal defects, such as pores. In fact, a specimen sintered at about 1380° C. at a pressure of about 200 kg/cm$^2$ has a sintered density of about 5.14 g/cm$^3$, which is more than about 99% of theoretical density. However, since this method necessitates expensive equipment and it cannot be applied to mass production, it can hardly be applied to actual production.

In the present invention, a magnetic ceramic composition for microwave application with improved sintering and magnetic characteristics is developed by synthesizing $Y_3Fe_5O_{12}$ (YIG) from $Fe_2O_3$ and $Y_2O_3$ and adding a little quantity of $SiO_2$ thereto. The magnetic ceramic composition that can be used in the microwave band includes about 95 to about 99.95 mol % of $Y_3Fe_5O_{12}$ and about 0.05 to about 5 mol % of $SiO_2$. The composition of the magnetic ceramic composition can be expressed as a formula shown below.

$$(100-x)Y_3Fe_5O_{12}+xSiO_2,\ 0.05 \leqq x \leqq 5 \text{ mol \%}$$

If the amount of $SiO_2$ is less than about 0.05 mol %, it has little affect on the magnetic loss. If $SiO_2$ is added more than about 5 mol %, it works as an impurity and thus increases the magnetic loss.

To prepare the basic composition YIG ($Y_3Fe_5O_{12}$), $Fe_2O_3$ and $Y_2O_3$ should be mixed in the mole ratio of 5:3 and perform solid-state reaction easily. To make the reaction performed easily, the preparation method of the present invention includes a calcination process of performing thermal treatment at a temperature ranging from about 1100° C. to about 1300° C. for about 5 hours to about 7 hours and obtains YIG ($Y_3Fe_5O_{12}$) powder.

Into the YIG powder, which is obtained from the above processes, a little amount of $SiO_2$ for accelerating sintering process is added and then mixed together. Subsequently, the mixture is molded and sintered at a temperature ranging from about 1250° C. to about 1450° C. Through these processes, a magnetic ceramic composition for microwave application can be obtained.

Hereinafter, the technology of the present invention will be described more in detail with reference to preferred examples and comparative examples. However, the present invention should be understood not limited to the preferred examples and comparative examples.

COMPARATIVE EXAMPLES 1 to 4

$Fe_2O_3$ and $Y_2O_3$ powder were measured in the mole ratio of 5:3 and mixed in a wet state for about 20 hours. Then, the mixture was dried until mixture powder was obtained. The mixture powder is calcined at 1200° C. for six hours to form YIG ($Y_3Fe_5O_{12}$). The powder obtained from the calcination could be identified to be $Y_3Fe_5O_{12}$ by performing X-ray diffusion (XRD). Subsequently, $Y_3Fe_5O_{12}$ Powder not containing $SiO_2$ was obtained by wet-mixing the powder for 20 hours, drying the mixture and sieving the dried mixture with a 100-mesh.

The obtained powder was put into a cylindrical mold having a diameter of 15 mm and mould at a pressure of around 1500 kg/cm$^2$, and sintered at different temperatures of 1300° C., 1350° C., 1400° C. and 1450° C. for four hours to form magnetic specimens. With respect to each the obtained magnetic specimens, the sintered density was obtained in the Archimedean method and the ferromagnetic resonance linewidth, which indicates the magnetic loss of the magnetic substance, was obtained by processing the magnetic specimen into a globe having a diameter of 0.5 mm and using a ferromagnetic resonance measuring instrument. The result is shown in Table. 1 below.

EXAMPLES 1 to 12

First, $Fe_2O_3$ and $Y_2O_3$ were selected and measured in the mole ratio of 5:3. Then, they were mixed in a wet state for about 20 hours. The mixture was dried until the mixture powder was obtained. The mixture powder was calcined at 1200° C. for six hours to form $Y_3Fe_5O_{12}$ (YIG). The powder obtained from the calcination could be identified to be YIG by performing XRD analysis. Into the obtained YIG, $SiO_2$ was added in the mole ratio of Table 2 with its amount varied in the range of less than about 0.5 mol % and, then, they were wet-mixed for another 20 hours, dried and sieved with a 100 mesh. Through these processes, the composition of the present invention was obtained as follows.

$$(100-x)Y_3Fe_5O_{12}+xSiO_2,\ 0.05 \leqq x \leqq 5 \text{ mol \%}$$

The obtained powder of the above composition was put into a cylindrical mold having a diameter of 15 mm, mould at the pressure of around 1500 kg/cm$^2$, and sintered at different temperatures ranging from 1300° C. to 1450° C. for four hours, respectively to prepare magnetic specimens. With respect to each of the magnetic specimens, the sintered density is obtained in the Archimedean method, and the ferromagnetic resonance linewidth, which indicates magnetic loss of a magnetic substance, is obtained by processing the magnetic specimens into globes having a diameter of 0.5 mm and using a ferromagnetic resonance measuring instrument. The result is shown in Table 1 below.

TABLE 1

Sintered density and ferromagnetic resonance of $Y_3Fe_5O_{12}$ + $xSiO_2$ magnetic ceramic

| | x (mol %) | Sintering Temperature | Sintered Density (g/cm$^2$) | Ferromagnetic Resonance Linewidth (Oe) |
|---|---|---|---|---|
| Comparative Example 1 | 0 | 1300° C. | 4.73 | |
| Comparative Example 2 | | 1350° C. | 4.89 | |
| Comparative Example 3 | | 1400° C. | 5.08 | 110 |
| Comparative Example 4 | | 1450° C. | 5.03 | 102 |
| Example 1 | 0.5 | 1300° C. | 5.14 | 54 |
| Example 2 | | 1350° C. | 5.15 | 48 |
| Example 3 | | 1400° C. | 5.13 | 60 |
| Example 4 | | 1450° C. | 5.09 | 61 |
| Example 5 | 1 | 1300° C. | 5.05 | 67 |
| Example 6 | | 1350° C. | 5.15 | 47 |
| Example 7 | | 1400° C. | 5.14 | 50 |
| Example 8 | | 1450° C. | 5.10 | 57 |
| Example 9 | 5 | 1300° C. | 4.93 | 83 |
| Example 10 | | 1350° C. | 5.12 | 64 |
| Example 11 | | 1400° C. | 5.12 | 58 |
| Example 12 | | 1450° C. | 5.04 | 71 |

In Table 1, the comparative examples 1 to 4 wherein $SiO_2$ is not added show that the levels of the sintered density is very low and that the ferromagnetic resonance linewidth is very high. However, the examples 1 to 12 of the present invention where an appropriate amount of $SiO_2$ is added have produced a YIG magnetic ceramic composition for microwave application, which have a sintered density of more than 99.5% of the theoretical density and a ferromagnetic resonance linewidth not more than 50 Oe, at a sintering temperature ranging from 1300° C. to 1350° C. From the respect of magnetic characteristics and sintered density, it is desirable to add about 0.5 to about 1.0 mol % of $SiO_2$ and perform the sintering at a temperature ranging from 1300° C. to 1350° C.

In the present invention, the proper sintering temperature of the composition can be lowered by more than about 100° C. by adding $SiO_2$ and the sintered density is also increased from about 5.08 g/cm$^3$ to about 5.15 g/cm$^3$. The ferromagnetic resonance linewidth, which indicates magnetic loss of a magnetic substance, is dropped less than a half of the case where $SiO_2$ is not added to about 47 Oe.

As described above, the present invention provides an excellent magnetic ceramic composition including $SiO_2$ ranging from about 0.5 mol % to about 1.0 mol % added to $Y_3Fe_5O_{12}$, which has a low sintering temperature, high sintered density and small magnetic loss, and a preparation method thereof. The composition of the present invention can be applied to irreversible passive components for communication used in a microwave band, such as circulator and isolator.

While the present invention has been described with respect to certain preferred examples, it will be apparent to those skilled in the art that various changes and modifications may be made without departing from the scope of the invention as defined in the following claims.

What is claimed is:

1. A magnetic ceramic composition for microwave application, comprising:

Yttrium iron garnet (YIG, $Y_3Fe_5O_{12}$) ranging from about 95 mol % to about 99.95 mol %; and silicon oxide ($SiO_2$) ranging from about 0.05 mol % to about 5 mol %.

2. A method for preparing a magnetic ceramic composition for microwave application, comprising the steps of:

a) mixing ferric oxide ($Fe_2O_3$) and yttrium oxide ($Y_2O_3$) in the ratio of 5:3 and calcining the mixture;

b) adding silicon oxide ($SiO_2$) ranging from about 0.05 mol % to about 5 mol % to the calcined mixture and mixing the mixture; and c) molding and sintering the mixture, wherein the magnetic ceramic composition has a composition of $(100-x)Y_3Fe_5O_{12}+xSiO_2$ ($0.05 \leqq x \leqq 5$ mol %).

3. The method as recited in claim 2, wherein the calcination is performed at a temperature ranging from about 1150° C. to 1250° C. for 5 to 7 hours.

4. The method as recited in claim 2, wherein the sintering is performed at a temperature ranging from about 1300° C. to about 1450° C. for 3 to 5 hours.

5. The method as recited in claim 2, wherein the amount of the silicon oxide ranges from about 0.5 mol % to about 1 mol %.

* * * * *